(12) United States Patent
Watanabe

(10) Patent No.: US 11,303,170 B2
(45) Date of Patent: Apr. 12, 2022

(54) ROTOR, MOTOR, COMPRESSOR, AND AIR CONDITIONER

(71) Applicant: Mitsubishi Electric Corporation, Tokyo (JP)

(72) Inventor: Takanori Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 143 days.

(21) Appl. No.: 16/626,451

(22) PCT Filed: Aug. 30, 2017

(86) PCT No.: PCT/JP2017/031243
§ 371 (c)(1),
(2) Date: Dec. 24, 2019

(87) PCT Pub. No.: WO2019/043850
PCT Pub. Date: Mar. 7, 2019

(65) Prior Publication Data
US 2020/0220402 A1  Jul. 9, 2020

(51) Int. Cl.
*H02K 1/27* (2006.01)
*F24F 1/022* (2019.01)
(Continued)

(52) U.S. Cl.
CPC .......... *H02K 1/2766* (2013.01); *F24F 1/022* (2013.01); *F25B 1/00* (2013.01); *H02K 7/14* (2013.01);
(Continued)

(58) Field of Classification Search
CPC ........ H02K 1/2766; H02K 7/14; H02K 21/16; H02K 2213/03; H02K 1/276; F24F 1/022; F25B 1/00; F25B 31/02
See application file for complete search history.

(56) References Cited

U.S. PATENT DOCUMENTS

| 6,527,523 B1 * | 3/2003 | Iida ......................... F04B 35/04 417/410.3 |
| 7,768,172 B2 * | 8/2010 | Takahata .............. H02K 1/2766 310/156.57 |

(Continued)

FOREIGN PATENT DOCUMENTS

| JP | H09-294344 A | 11/1997 |
| JP | 2013-128384 A | 6/2013 |

(Continued)

*Primary Examiner* — Tulsidas G Patel
*Assistant Examiner* — Riley O Stout
(74) *Attorney, Agent, or Firm* — Posz Law Group, PLC

(57) ABSTRACT

A rotor includes a rotor core having an outer circumference extending in a circumferential direction about an axis, and having a magnet insertion hole along the outer circumference, and a permanent magnet disposed in the magnet insertion hole. The rotor core has a plurality of slits formed on an outer side of the magnet insertion hole in a radial direction about the axis, and a bridge extending to connect an inner side and an outer side of the magnet insertion hole in the radial direction. The plurality of slits have a first slit closest to an end of the magnet insertion hole in the circumferential direction, and a second slit closest to the bridge. When T1 represents a shortest distance from the magnet insertion hole to the first slit and R1 represents a shortest distance from the reference point to the second slit, R1>T1 is satisfied.

18 Claims, 14 Drawing Sheets

(51) Int. Cl.
  *F25B 1/00*    (2006.01)
  *H02K 7/14*    (2006.01)
  *H02K 21/16*   (2006.01)
  *H02K 1/276*   (2022.01)

(52) U.S. Cl.
  CPC ......... *H02K 21/16* (2013.01); *H02K 2213/03* (2013.01)

(56) References Cited

U.S. PATENT DOCUMENTS

| | | | |
|---|---|---|---|
| 2008/0224558 A1* | 9/2008 | Ionel | H02K 1/2766 310/156.57 |
| 2011/0309706 A1* | 12/2011 | Takahashi | H02K 1/2766 310/156.53 |
| 2013/0119817 A1 | 5/2013 | Arimatsu et al. | |

FOREIGN PATENT DOCUMENTS

| | | | |
|---|---|---|---|
| JP | 5215486 | B1 | 6/2013 |
| JP | 2015-171272 | A | 9/2015 |

* cited by examiner

ROTOR, MOTOR, COMPRESSOR, AND AIR CONDITIONER

CROSS REFERENCE TO RELATED APPLICATION

This application is a U.S. national stage application of International Patent Application No. PCT/JP2017/031243 filed on Aug. 30, 2017, the disclosure of which is incorporated herein by reference.

TECHNICAL FIELD

The present invention relates to a permanent magnet-embedded rotor, and relates to a motor, a compressor, and an air conditioner each of which includes the rotor.

BACKGROUND

In a permanent magnet-embedded rotor, a permanent magnet is disposed in a magnet insertion hole formed in a rotor core.

When the rotor rotates, a magnetic field of the permanent magnet induces a voltage in coils of a stator, and a harmonic component of the voltage (induced voltage) causes vibration and noise of a motor. Thus, it has been proposed to form slits on an outer circumferential part of the rotor core in order to reduce the harmonic component of the induced voltage (see, for example, Patent Reference 1).

In order to enhance strength of the rotor core, it has also been proposed to provide a bridge in the magnet insertion hole. Various arrangements for relaxing stress concentration around the bridge have been proposed (see, for example, Patent References 2 and 3).

PATENT REFERENCE

Patent Reference 1: Japanese Patent Application Publication No. 2015-171272 (see FIG. 2)
Patent Reference 2: Japanese Patent Application Publication No. 2013-128384 (see FIG. 4)
Patent Reference 3: Japanese Patent Application Publication No. H9-294344 (see FIG. 1)

However, when the bridge is provided in the magnet insertion hole, magnetic flux generated by a magnetic field (demagnetizing field) from a stator may flow into the bridge, and corners of the permanent magnet in contact with the bridge may therefore be demagnetized.

Particularly, when the rotor is provided with the bridge and slits, the magnetic flux generated by the demagnetizing field may concentrate on a region between the magnet insertion hole and the slits and flow into the permanent magnet through the bridge, so that demagnetization of the permanent magnet may occur.

SUMMARY

The present invention is made to solve the above described problem, and an object of the present invention is to suppress demagnetization of a permanent magnet of a rotor and reduce a harmonic component of an induced voltage.

A rotor according to the present invention includes a rotor core having an outer circumference extending in a circumferential direction about an axis, and having a magnet insertion hole along the outer circumference, and a permanent magnet disposed in the magnet insertion hole. The rotor core includes a plurality of slits formed on an outer side of the magnet insertion hole in a radial direction about the axis, and a bridge extending to connect an inner side and an outer side of the magnet insertion hole in the radial direction. The plurality of slits include a first slit closest to an end of the magnet insertion hole in the circumferential direction, and a second slit closest to the bridge. When T1 represents a shortest distance from the magnet insertion hole to the first slit, a reference point represents a point located at a center of the bridge in the circumferential direction on a straight line defining an end edge of the magnet insertion hole on an outer side in the radial direction, and R1 represents a shortest distance from the reference point to the second slit, R1>T1 is satisfied.

According to the present invention, the shortest distance T1 from the magnet insertion hole to the first slit is shorter than the shortest distance R1 from the reference point to the second slit. Thus, a harmonic component of an induced voltage induced in coils of a stator can be reduced, and concentration of magnetic flux around the bridge can be suppressed. Therefore, demagnetization of the permanent magnet can be suppressed.

DETAILED DESCRIPTION

Embodiment 1

(Configuration of Motor)

Figure 1:
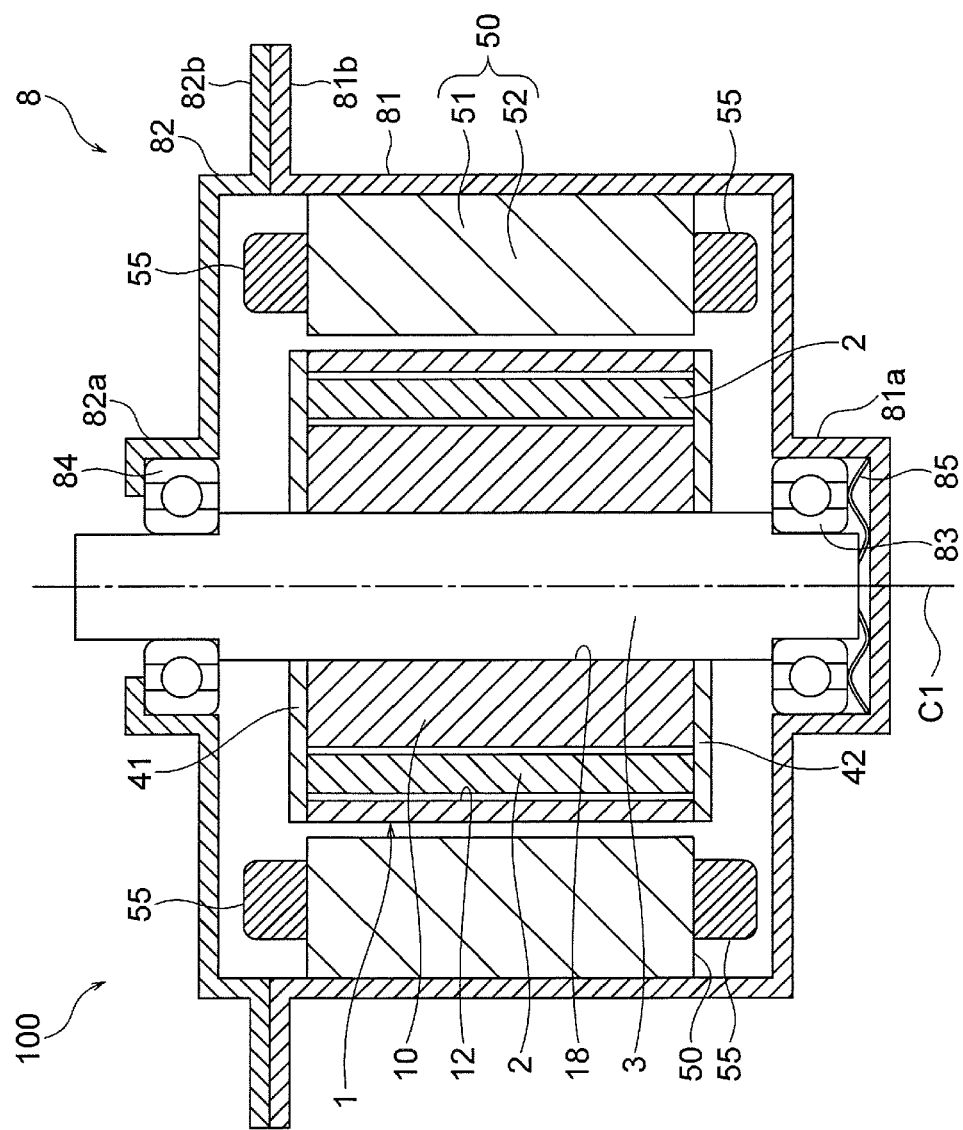
FIG. 1 is a longitudinal sectional view of a motor according to Embodiment 1.

A motor according to Embodiment 1 of the present invention will be described. FIG. 1 is a longitudinal sectional view illustrating a configuration of a motor 100 according to Embodiment 1. The motor 100 according to Embodiment 1 is a brushless DC motor. The motor 100 is a permanent magnet-embedded motor having permanent magnets embedded in a rotor. The motor 100 includes a rotor 1 including a shaft 3 serving as a rotation shaft, an annular stator 5 disposed around the rotor 1, and a housing 8 in which the stator 5 is housed.

Hereinafter, a direction of an axis C1 serving as a rotation axis of the rotor 1 (that is, a center axis of the shaft 3) will be referred to as an "axial direction". A circumferential direction (that is, a direction along outer circumferences of the rotor 1 and the stator 5) about the axis C1 will be referred to as a "circumferential direction", and is indicated by an arrow R in FIGS. 2 and 3. A radial direction about the axis C1 (that is, a radial direction of the rotor 1 and the stator 5) will be referred to as a "radial direction".

The housing 8 is divided into a frame 81 and a bracket 82 in the direction of the rotation axis of the rotor 1. The frame 81 is cylindrical, and the stator 5 is inserted inside the frame 81. The frame 81 includes a flange part 81b at an end on the bracket 82 side, and a bearing holding part 81a at the other end. A bearing 83 is held inside the bearing holding part 81a.

The bracket 82 is cylindrical, and includes a flange part 82b at an end on the frame 81 side, and a bearing holding part 82a at the other end. A bearing 84 is held in the bearing holding part 82a. The bearings 83 and 84 rotatably support the shaft 3 of the rotor 1. The flange parts 81b and 82b of the frame 81 and the bracket 82 are fixed to each other by bonding, screw-fastening, or welding.

A spring 85 for applying a pressure to the bearing 83 in the axial direction is disposed between the bearing 83 and a bottom of the bearing holding part 81a of the frame 81. The spring 85 is constituted by, for example, a wave washer.

Figure 2:
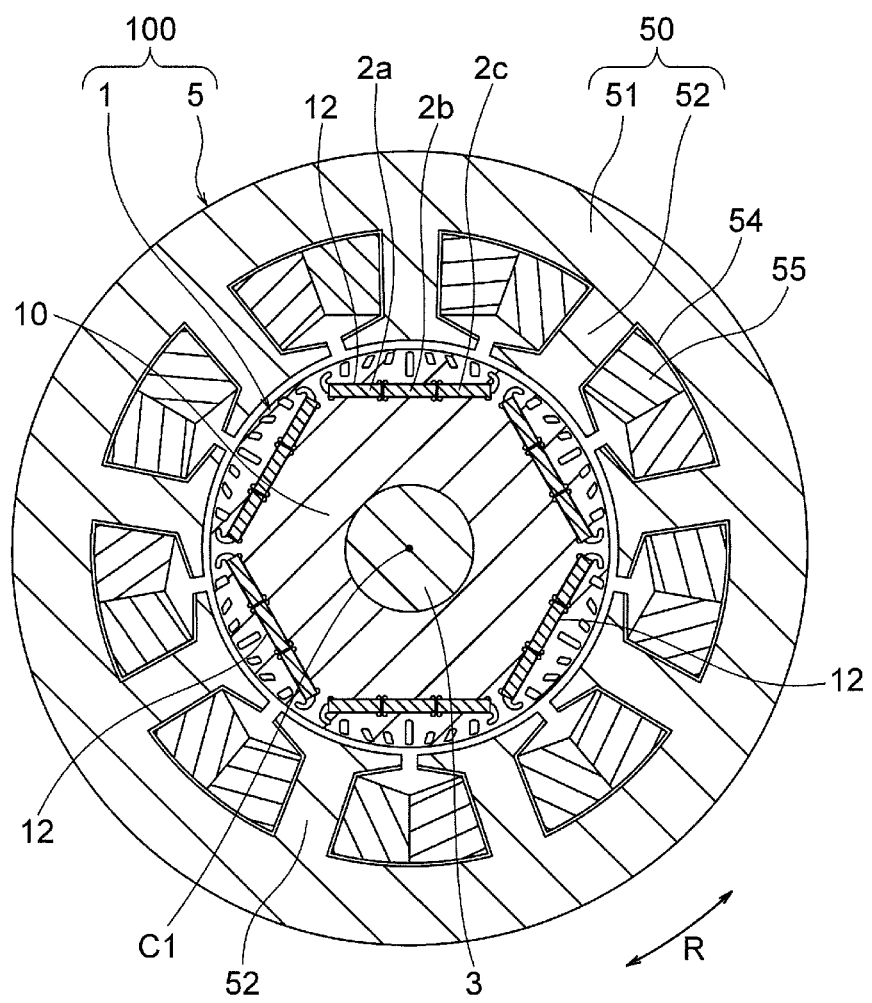
FIG. 2 is a sectional view of the motor according to Embodiment 1.

FIG. 2 is a sectional view illustrating a configuration of the motor 100, and illustrates a cross section perpendicular to the rotation axis (axis C1) of the rotor 1. The housing 8 is omitted in FIG. 2. The motor 100 includes the annular stator 5, and the rotor 1 disposed on an inner side of the stator 5, and an air gap is formed between the rotor 1 and the stator 5.

The stator 5 includes a stator core 50, and coils 55 wound around the stator core 50. The stator core 50 is made of a plurality of electromagnetic steel sheets each having a thickness of 0.1 to 0.7 mm (0.35 mm in this example) which are stacked in the axial direction and fastened together by crimping or the like.

The stator core 50 includes a yoke 51 having an annular shape about the axis C1, and a plurality of teeth 52 projecting inward in the radial direction from the yoke 51. The number of teeth 52 is nine in this example, but it is not limited to nine. Slots for housing the coils 55 are formed each between the teeth 52 adjacent to each other in the circumferential direction. Each tooth 52 has a tooth end part at its inner end in the radial direction, and the tooth end part has a wide width (i.e., dimension in the circumferential direction of the stator core 50).

The coils 55 serving as stator windings are wound around the teeth 52. The coils 55 are formed by magnet wires wound around the teeth 52 via insulators 54. The coils 55 of three phases (U, V, and W phases) are connected in Y connection. The stator 5 is fixed to an inner circumference of the frame 81 illustrated in FIG. 1 by, for example, shrink fitting.

(Configuration of Rotor)

Figure 3:
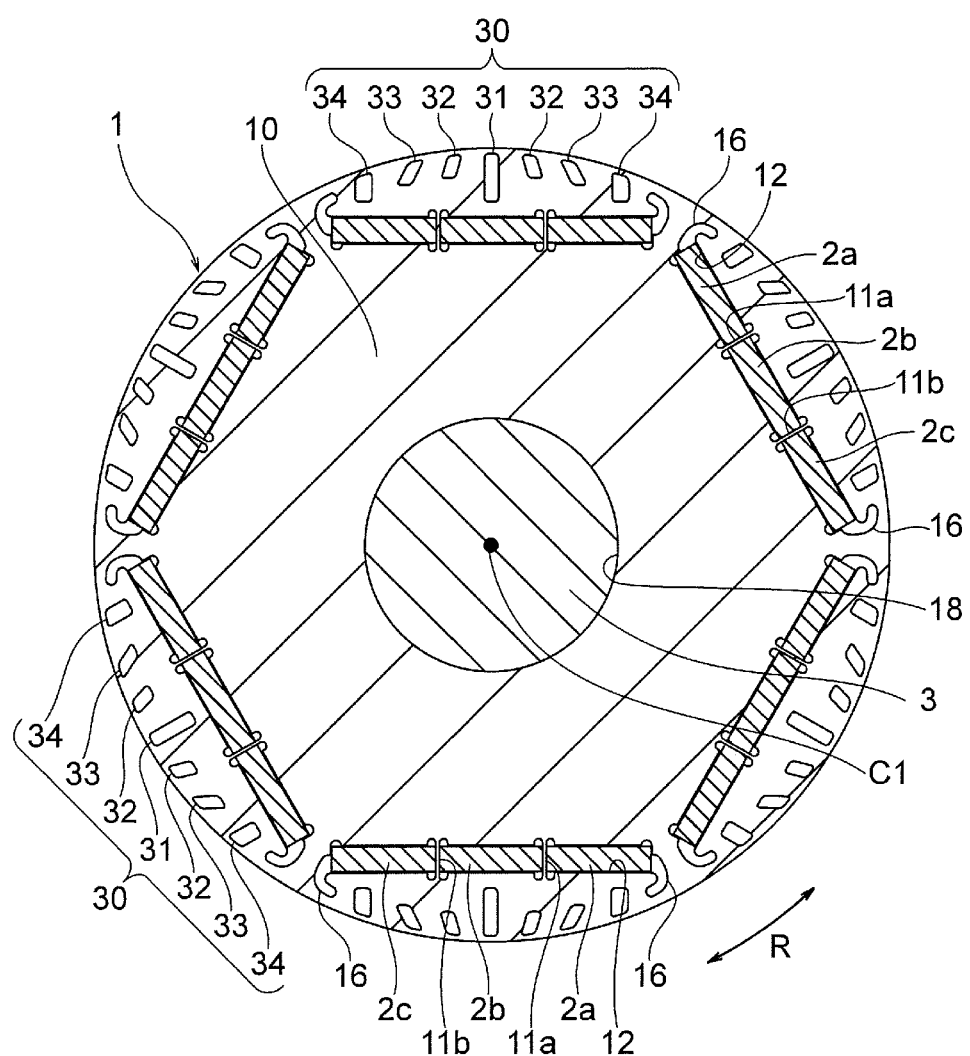
FIG. 3 is a sectional view of a rotor of the motor according to Embodiment 1.

FIG. 3 is a sectional view illustrating a configuration of the rotor 1 of the motor 100 according to Embodiment 1, and illustrates a cross section perpendicular to the axis C1. The rotor 1 includes the shaft 3, the rotor core 10 fixed to the shaft 3, and permanent magnets 2a, 2b, and 2c embedded in the rotor core 10, as illustrated in FIG. 3.

The rotor core 10 is made of a plurality of electromagnetic steel sheets each having a thickness of 0.1 to 0.7 mm (0.35 mm in this example) which are stacked in the axial direction and fastened together by crimping or the like. The rotor core 10 is cylindrical, and has an outer circumferential surface extending in the circumferential direction. A shaft hole 18 (center hole) is formed at a center of the rotor core 10 in the radial direction. The shaft 3 serving as a rotation shaft is fixed to the shaft hole 18 by shrink fitting, press fitting or the like.

A plurality of magnet insertion holes 12 are formed along an outer circumference of the rotor core 10. The number of magnet insertion holes 12 is six in this example. Since one magnet insertion hole 12 corresponds to one magnetic pole, the rotor 1 has six poles. The number of magnet insertion holes 12 is not limited to six. A part between adjacent magnet insertion holes 12 is an inter-pole part. A center of the magnet insertion hole 12 in the circumferential direction is a pole center (also referred to as a magnetic pole center).

The magnet insertion holes 12 pass through the rotor core 10 in the axial direction (see FIG. 1). The magnet insertion hole 12 extends linearly along the outer circumference of the rotor core 10. More specifically, the magnet insertion hole 12 extends linearly in a direction perpendicular to a straight line (that is, a magnetic pole center line A1 illustrated in FIG. 4) extending in the radial direction and passing through the pole center.

The permanent magnet 2a (first permanent magnet), the permanent magnet 2b (second permanent magnet), and the permanent magnet 2c (third permanent magnet) are arranged side by side in the circumferential direction in each magnet insertion hole 12. In this example, the permanent magnet 2b is disposed at a center in the circumferential direction, and the permanent magnets 2a and 2c are disposed on both sides of the permanent magnet 2b.

Each of the permanent magnets 2a, 2b, and 2c is a flat plate member elongated in the axial direction of the rotor core 10, and has a width in the circumferential direction of the rotor core 10 and a thickness in the radial direction. Each of the permanent magnets 2a, 2b, and 2c is formed of, for example, a rare-earth magnet containing neodymium (Nd), iron (Fe), and boron (B).

Each of the permanent magnets 2a, 2b, and 2c is magnetized in a thickness direction. The three permanent magnets 2a, 2b, and 2c disposed in each magnet insertion hole 12 are magnetized so that the same magnetic poles face the same side in the radial direction. The permanent magnets 2a, 2b, and 2c will be collectively referred to as permanent magnets 2.

Flux barriers 16 are formed on both sides of each magnet insertion hole 12 in the circumferential direction. The flux barriers 16 are openings formed continuously with the magnet insertion hole 12, and extend outward in the radial direction from the magnet insertion hole 12. Each flux barrier 16 is provided for suppressing leakage magnetic flux (that is, magnetic flux flowing through the inter-pole part) between adjacent magnetic poles. A distance between the flux barrier 16 and the outer circumference of the rotor core 10 is, for example, equal to the thickness of the electromagnetic steel sheet of the rotor core 10.

As illustrated in FIG. 1, end plates 41 and 42 are fixed to both ends of the rotor core 10 in the axial direction in order to prevent the permanent magnets 2 from falling out of the magnet insertion holes 12. The end plates 41 and 42 are fixed to the rotor core 10 by, for example, welding, bonding, fastening with bolts and nuts, or press fitting by forming a spigot-joint part.

Figure 4:
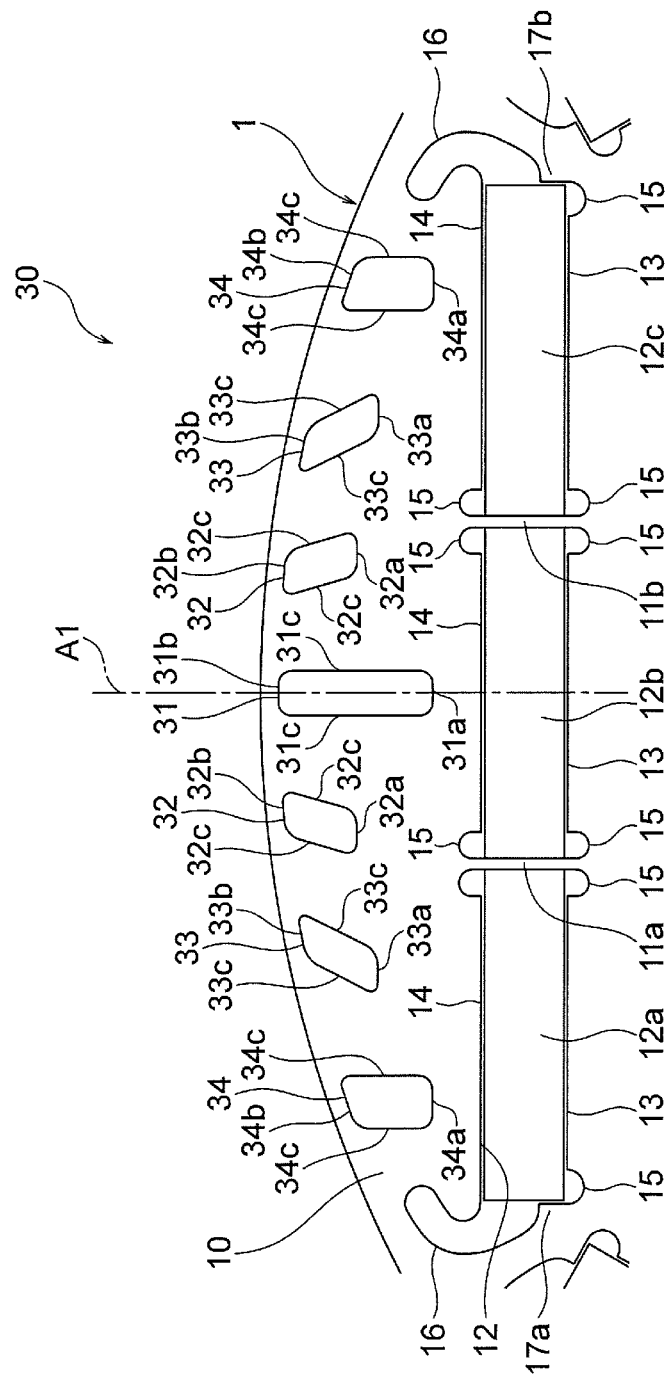
FIG. 4 is an enlarged view illustrating a part of the rotor according to Embodiment 1.

Next, the magnet insertion hole 12 and a slit group 30 in the rotor core 10 will be described. FIG. 4 is an enlarged view illustrating a part of the rotor core 10. The rotor core 10 includes two bridges 11a and 11b dividing the magnet insertion hole 12 into three regions in the circumferential direction, as illustrated in FIG. 4. Each of the bridges 11a and 11b extends to connect an inner side and an outer side of the magnet insertion hole 12 in the radial direction.

A first region 12a for inserting the permanent magnet 2a is formed between the bridge 11a and one end (in this example, a left end) of the magnet insertion hole 12 in the circumferential direction. A second region 12b for inserting the permanent magnet 2b is formed between the bridge 11a and the bridge 11b. A third region 12c for inserting the permanent magnet 2c is formed between the bridge 11b and the other end (in this example, a right end) of the magnet insertion hole 12 in the circumferential direction.

Positioning parts (stepped parts) 17a and 17b are formed on both ends of the magnet insertion hole 12 in the circumferential direction and on inner sides of the flux barriers 16 in the radial direction. The positioning part 17a faces one end face of the permanent magnet 2a in the circumferential direction, and the positioning part 17b faces one end face of the permanent magnet 2c in the circumferential direction.

The permanent magnet 2a is positioned by the positioning part 17a and the bridge 11a so as not to move in the circumferential direction. The permanent magnet 2b is positioned by the bridges 11a and 11b so as not to move in the circumferential direction. The permanent magnet 2c is positioned by the bridge 11b and the positioning part 17b so as not to move in the circumferential direction.

Each of the permanent magnets 2a, 2b, and 2c is positioned so as not to move in the radial direction between an end edge (inner end edge) 13 of the magnet insertion hole 12 on an inner side in the radial direction and an end edge (outer end edge) 14 of the magnet insertion hole 12 on an outer side in the radial direction. In this manner, the permanent magnets 2a, 2b, and 2c are positioned in the regions 12a, 12b, and 12c of the magnet insertion hole 12.

The bridges 11a and 11b not only position the permanent magnets 2a, 2b, and 2c in the magnet insertion hole 12, but also connect the inner side and the outer side in the radial direction of the magnet insertion hole 12 to thereby enhance strength of the rotor core 10.

A width (dimension in the circumferential direction) of each of the bridges 11a and 11b is set to 1.0 to 1.5 times the thickness of the electromagnetic steel sheet. This is because the widths of the bridges 11a and 11b are desirably as narrow as possible in order to suppress demagnetization of the permanent magnets 2a, 2b, and 2c due to a demagnetizing field from the stator 5. In this example, the thickness of the electromagnetic steel sheet is 0.5 mm, and the width of each of the bridges 11a and 11b is also 0.5 mm. The bridges 11a and 11b will be collectively referred to as bridges 11.

On the outer end edge 14 of the magnet insertion hole 12, openings 15 are formed in portions (four portions) adjacent to the bridges 11a and 11b in the circumferential direction.

On the inner end edge 13 of the magnet insertion hole 12, openings 15 are formed in portions (four portions) adjacent to the bridges 11a and 11b in the circumferential direction. On the inner end edge 13 of the magnet insertion hole 12, openings 15 are formed in portions (two portions) adjacent to the positioning parts 17a and 17b.

Each of the openings 15 is a semicircular groove extending inward in the radial direction or outward in the radial direction from the magnet insertion hole 12. A periphery (inner circumference) of each of the openings 15 is arc-shaped. The outer end edge 14 and the inner end edge 13 of the magnet insertion hole 12 extend linearly except for the portions where the openings 15 are formed.

When the regions 12a, 12b, and 12c of the magnet insertion hole 12 are formed by machining the electromagnetic steel sheets, it is difficult to machine corners of the bases of the bridges 11a and 11b to complete right angles. If the corners of the bases of the bridges 11a and 11b are rounded, it is difficult to dispose the permanent magnets 2a, 2b, and 2c in the regions 12a, 12b and 12c without gaps. By forming the openings 15 as describe above, the corners of the bases of the bridges 11a and 11b are not rounded, and thus the permanent magnets 2a, 2b, and 2c can be disposed in the regions 12a, 12b, and 12c of the magnet insertion hole 12 with no gaps.

The slit group 30 is formed between the magnet insertion hole 12 and the outer circumference of the rotor core 10. The slit group 30 is provided for smoothening a distribution of magnetic flux flowing from the permanent magnets 2 toward the stator 5. Smoothing the distribution of the magnetic flux reduces a harmonic component of a voltage (induced voltage) induced in the coils 55 of the stator 5 by the magnetic field (rotating magnetic field) of the permanent magnets 2 when the rotor 1 rotates.

The slit group 30 includes a slit 31 formed at the pole center, a pair of slits 32 formed on both sides of the slit 31 in the circumferential direction, a pair of slits 33 formed on both sides of the slits 32 in the circumferential direction, and a pair of slits 34 formed on both sides of the slits 33 in the circumferential direction.

Of the slit group 30, the slits 34 are slits (first slits) closest to the ends of the magnet insertion hole 12 in the circumferential direction. Of the slit group 30, the slits 32 are slits (second slits) closest to the bridges 11.

Shapes of the slits 31, 32, 33, and 34 will be sequentially described. The slit 31 (third slit) extends in the radial direction at the pole center (that is, on the magnetic pole center line A1).

The slit 31 includes an inner end edge 31a on an inner side in the radial direction, an outer end edge 31b on an outer side in the radial direction, and a pair of side end edges 31c on both sides in the circumferential direction. The inner end edge 31a and the outer end edge 31b extend parallel to the outer end edge 14 of the magnet insertion hole 12. The side end edges 31c extend parallel to the magnetic pole center line A1. Each of four corners of the slit 31 has a curved shape.

The pair of slits 32 (second slits) have shapes symmetrical to each other with respect to the magnetic pole center line A1, and each slit 32 is inclined so that a distance from the magnetic pole center line A1 decreases outward in the radial direction.

Each slit 32 includes an inner end edge 32a on an inner side in the radial direction, an outer end edge 32b on an outer side in the radial direction, and a pair of side end edges 32c on both sides in the circumferential direction. The inner end edge 32a extends parallel to the outer end edge 14 of the magnet insertion hole 12. The outer end edge 32b extends linearly along the outer circumference of the rotor core 10. Each side end edge 32c is inclined so that a distance from the magnetic pole center line A1 decreases outward in the radial direction. Each of four corners of the slit 32 has a curved shape.

The pair of slits 33 have shapes symmetrical to each other with respect to the magnetic pole center line A1, and each slit 33 is inclined so that a distance from the magnetic pole center line A1 decreases outward in the radial direction. An angle of inclination of the slit 33 is larger than that of the above described slit 32.

Each slit 33 includes an inner end edge 33a on an inner side in the radial direction, an outer end edge 33b on an outer side in the radial direction, and a pair of side end edges 33c on both sides in the circumferential direction. The inner end edge 33a extends parallel to the outer end edge 14 of the magnet insertion hole 12. The outer end edge 33b extends linearly along the outer circumference of the rotor core 10. Each side end edge 33c is inclined so that a distance from the magnetic pole center line A1 decreases outward in the radial direction. Each of four corners of the slit 33 has a curved shape.

The pair of slits 34 (first slits) have shapes symmetrical to each other with respect to the magnetic pole center line A1, and extend parallel to the magnetic pole center line A1.

Each slit 34 includes an inner end edge 34a on an inner side in the radial direction, an outer end edge 34b on an outer side in the radial direction, and a pair of side end edges 34c on both sides in the circumferential direction. The inner end edge 34a extends parallel to the outer end edge 14 of the magnet insertion hole 12. The outer end edge 34b extends linearly along the outer circumference of the rotor core 10. The side end edges 34c extend parallel to the magnetic pole center line A1. Each of four corners of the slit 34 has a curved shape.

Figure 5:
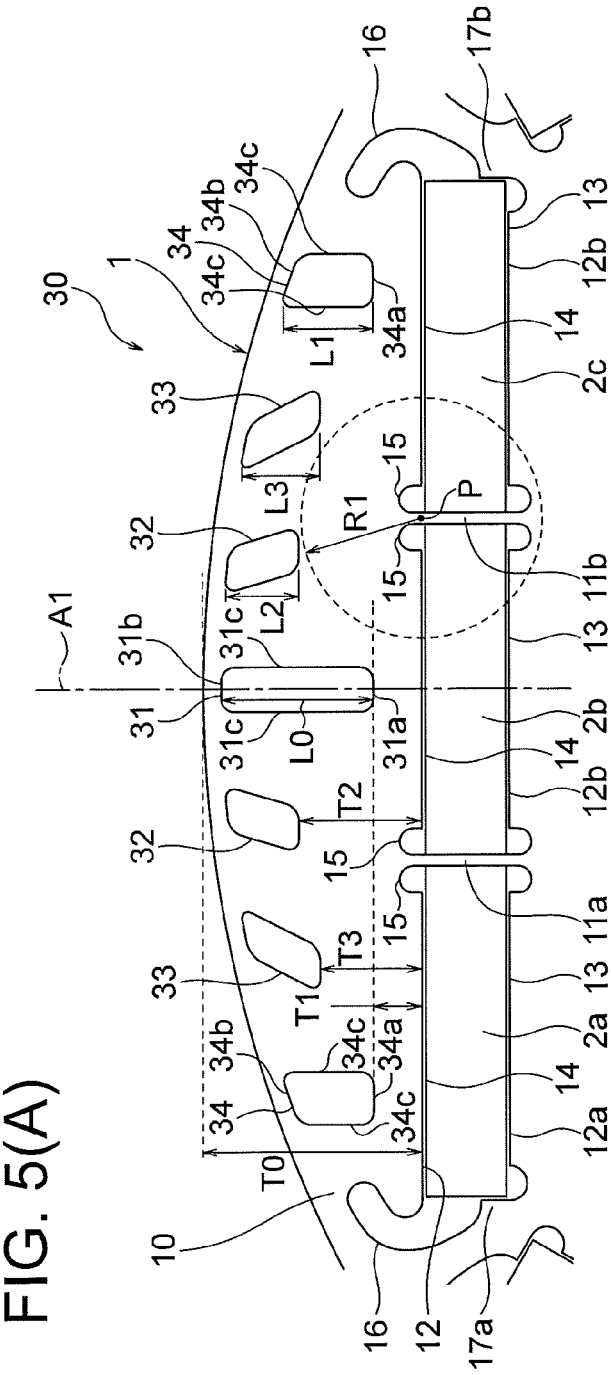
FIG. 5(A) is an enlarged view illustrating a part of the rotor according to Embodiment 1.
FIG. 5(B) is a schematic view illustrating a base of a bridge and its surroundings.

FIG. 5(A) is a schematic view for explaining a positional relationship between the magnet insertion hole 12 and the slits 31, 32, 33, and 34. A distance from the magnet insertion hole 12 to the outer circumference of the rotor core 10 at the pole center (that is, on the magnetic pole center line A1) is represented by T0.

A distance from the outer end edge 14 of the magnet insertion hole 12 to the inner end edge 34a of the slit 34 (first slit), that is, the shortest distance from the magnet insertion hole 12 to the slit 34 is represented by T1.

A distance from the outer end edge 14 of the magnet insertion hole 12 to the inner end edge 31a of the slit 31 (third slit), that is, the shortest distance from the magnet insertion hole 12 to the slit 31 is also T1.

A distance from the outer end edge 14 of the magnet insertion hole 12 to the inner end edge 32a of the slit 32 (second slit), that is, the shortest distance from the magnet insertion hole 12 to the slit 32 is T2 that is longer than T1.

A distance from the outer end edge 14 of the magnet insertion hole 12 to the inner end edge 33a of the slit 33, that is, the shortest distance from the magnet insertion hole 12 to the slit 33 is T3 that is longer than T1 and shorter than T2.

FIG. 5(B) is a schematic view for explaining a reference point based on which the distance from the bridge 11 to the slit 32 is defined. As illustrated in FIG. 5(B), a reference point P is defined on a straight line L1 and at a center position of each bridge 11 (bridge 11a, 11b) in the circumferential direction. The straight line L1 defines the outer end edge 14 of the magnet insertion hole 12. The distance to the slit 32 is defined as a distance from the reference point P as a starting point.

The shortest distance from the reference point P to the slit 32 (second slit) closest to the bridge 11 is represented by R1. R1 is a radius of a virtual circle about the reference point P, which has a minimum radius and is in contact with the slit 32 (more specifically, the inner end edge 32a of the slit 32).

In this example, R1 is larger than T1 (R1>T1). Therefore, a region wider than a region between the magnet insertion hole 12 and the slit 34 is formed on the outer circumference side of the bridge 11 (outer side of the bridge 11 in the radial direction) in the rotor core 10. In other words, magnetic flux generated by a demagnetizing field from the stator 5 is inhibited from concentrating on the outer circumference side of the bridge 11 in the rotor core 10.

The slits 31, 32, 33, and 34 have lengths L0, L2, L3, and L1, respectively, in a direction parallel to the magnetic pole center line A1. The length L0 of the slit 31 is the longest, the length L1 of the slit 34 is the second longest, and the length L2 of the slit 32 is the shortest. In this example, these lengths satisfy L0>L1>L3>L2.

Figure 6:
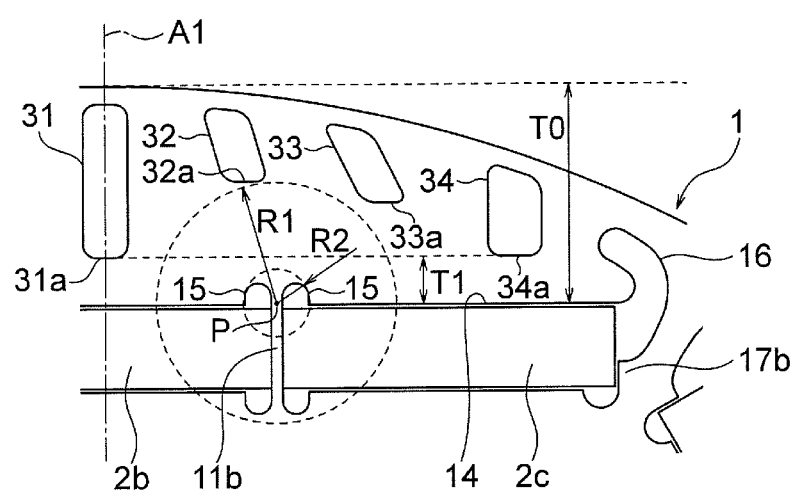
FIG. 6 is an enlarged view illustrating a part of the rotor according to Embodiment 1.

FIG. 6 is an enlarged view illustrating the bridge 11 of the rotor 1 and its surroundings. The distance from the reference point P to a point farthest from the reference point P on the inner circumference of the opening 15 is represented by R2. R2 is the radius of a virtual circle about the reference point P, which has a maximum radius and is in contact with the inner circumference of the opening 15. In this example, R1−R2>T1 is satisfied. Therefore, a region wider than a region between the magnet insertion hole 12 and the slit 34 is formed on the outer circumference side of the bridge 11 and outside the opening 15 in the rotor core 10.

Comparative Examples

Figure 7A:
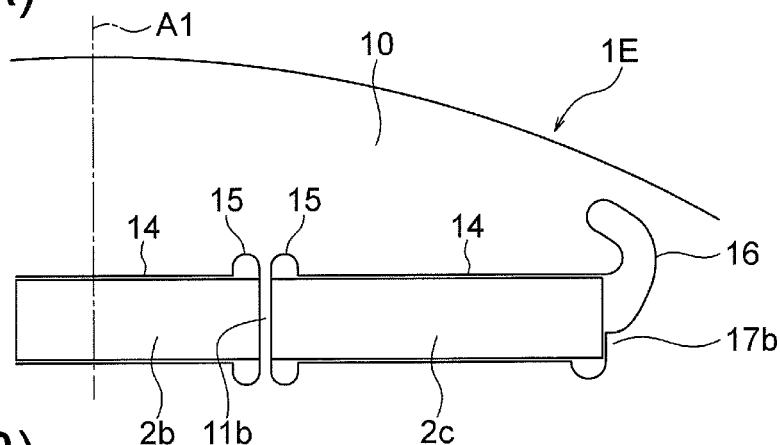
FIGS. 7(A), (B) and (C) are enlarged view illustrating parts of rotors according to Comparative Examples.
Figure 7B:
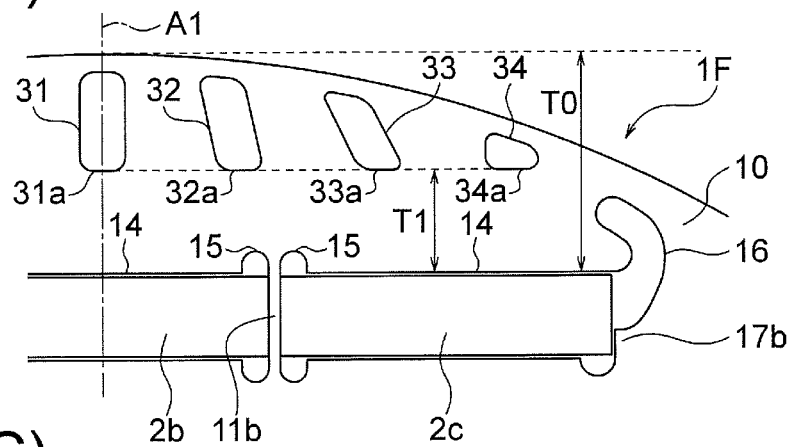
Figure 7C:
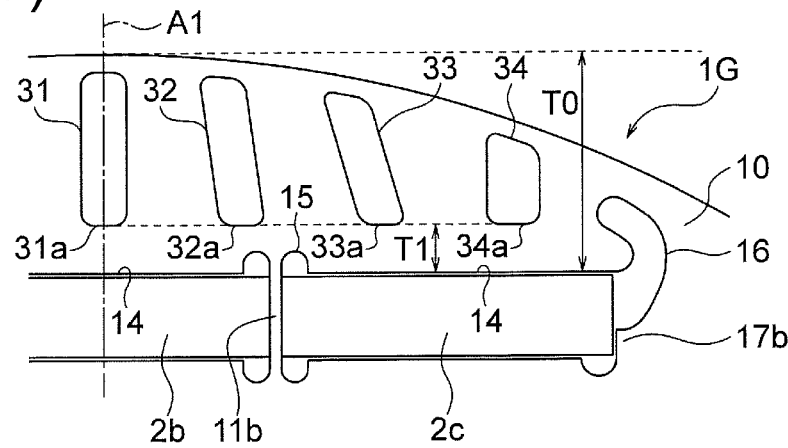

In order to make comparison with the rotor 1 according to Embodiment 1, rotors according to Comparative Examples will be described herein. FIGS. 7(A), 7(B), and 7(C) are enlarged views illustrating a part of a rotor 1E according to Comparative Example 1, a part of a rotor 1F according to Comparative Example 2, and a part of a rotor 1G according to Comparative Example 3, respectively.

The rotor 1E according to Comparative Example 1 illustrated in FIG. 7(A) includes no slit on the outer side of the magnet insertion hole 12 in the radial direction. The rotor 1E is the same as the rotor 1 according to Embodiment 1 in other respects.

The rotor 1F according to Comparative Example 2 illustrated in FIG. 7(B) includes slits 31, 32, 33, and 34 on the outer side of the magnet insertion hole 12 in the radial direction. However, the distances T1 from the outer end edge 14 of the magnet insertion hole 12 to the inner end edges 31a, 32a, 33a, and 34a of the slits 31, 32, 33, and 34 are uniform and 0.43 times the distance T0 from the magnet insertion hole 12 to the outer circumference of the rotor core 10 at the pole center. The rotor 1F is the same as the rotor 1 according to Embodiment 1 in other respects.

The rotor 1G according to Comparative Example 3 illustrated in FIG. 7(C) includes slits 31, 32, 33, and 34 on the outer side of the magnet insertion hole 12 in the radial direction. However, the distances T1 from the outer end edge 14 of the magnet insertion hole 12 to the inner end edges 31a, 32a, 33a, and 34a of the slits 31, 32, 33, and 34 are uniform and 0.17 times the distance T0 from the magnet insertion hole 12 to the outer circumference of the rotor core 10 at the pole center. The rotor 1G is the same as the rotor 1 according to Embodiment 1 in other respects.

(Experimental Results)

Using the rotors 1E, 1F, and 1G (FIGS. 7(A) to 7(C)) according to the Comparative Examples, a relationship between the distance T1 from the magnet insertion hole 12 to each of the slits 31, 32, 33, and 34, and a demagnetizing factor and a harmonic component of an induced voltage is examined. The result of the examination will be described below.

Figure 8:
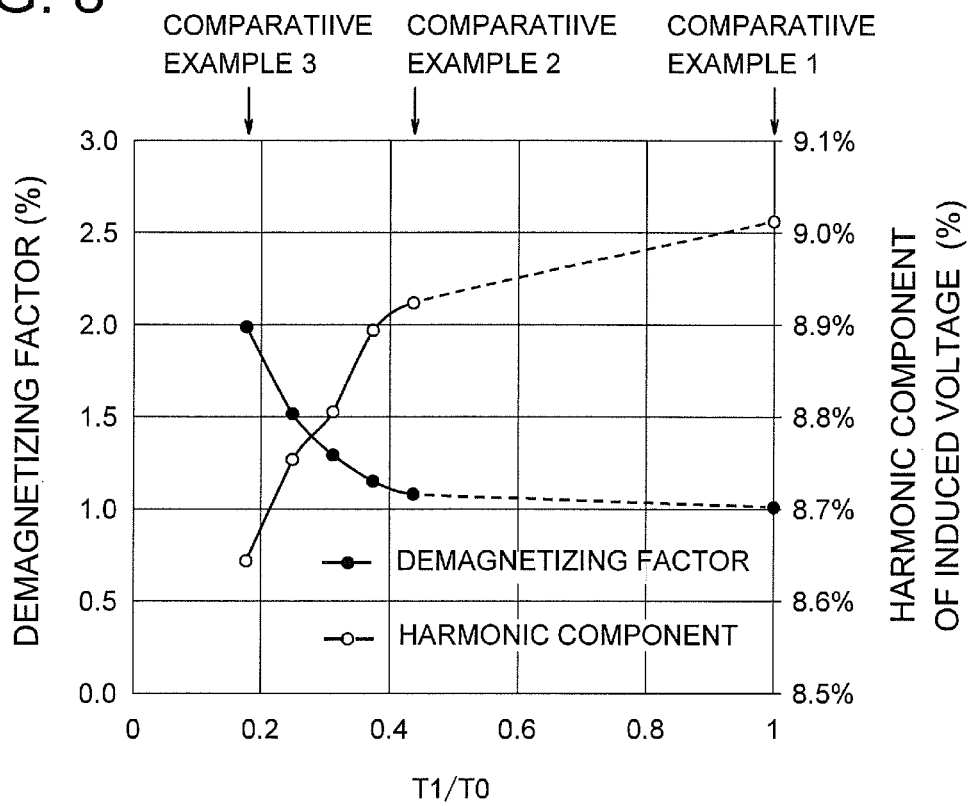
FIG. 8 is a graph illustrating a relationship between T1/T0 and a demagnetizing factor and a harmonic component of an induced voltage.

FIG. 8 is a graph illustrating a relationship between T1/T0, and the demagnetizing factor and the harmonic component of the induced voltage. T1/T0 on the horizontal axis is a value obtained by dividing the distance T1 from the magnet insertion hole 12 to each of the slits 31, 32, 33, and 34 by the distance T0 from the magnet insertion hole 12 to the outer circumference of the rotor core 10 at the pole center. The vertical axis indicates the measurement results of the demagnetizing factor (left) and the harmonic component of the induced voltage (right).

In the rotor 1E (FIG. 7(A)) according to Comparative Example 1 including no slits, it is assumed that T1/T0=1. In the rotor 1F (FIG. 7(B)) according to Comparative Example 2, T1/T0=0.43. In the rotor 1G (FIG. 7(C)) according to Comparative Example 3, T1/T0=0.17. In FIG. 8, T1/T0 is changed in a range of 0.17 to 1.0.

As illustrated in FIG. 8, as T1/T0 decreases, the harmonic component of the induced voltage decreases, but the demagnetizing factor of the permanent magnet 2 increases. As T1/T0 increases, the demagnetizing factor of the permanent magnet 2 decreases, but the harmonic component of the induced voltage increases. In other words, as intervals from the magnet insertion hole 12 to the slits 31, 32, 33, and 34 decrease, effect of suppressing the harmonic component of the induced voltage tends to be enhanced, but demagnetization of the permanent magnets 2 is more likely to occur.

Figure 9:
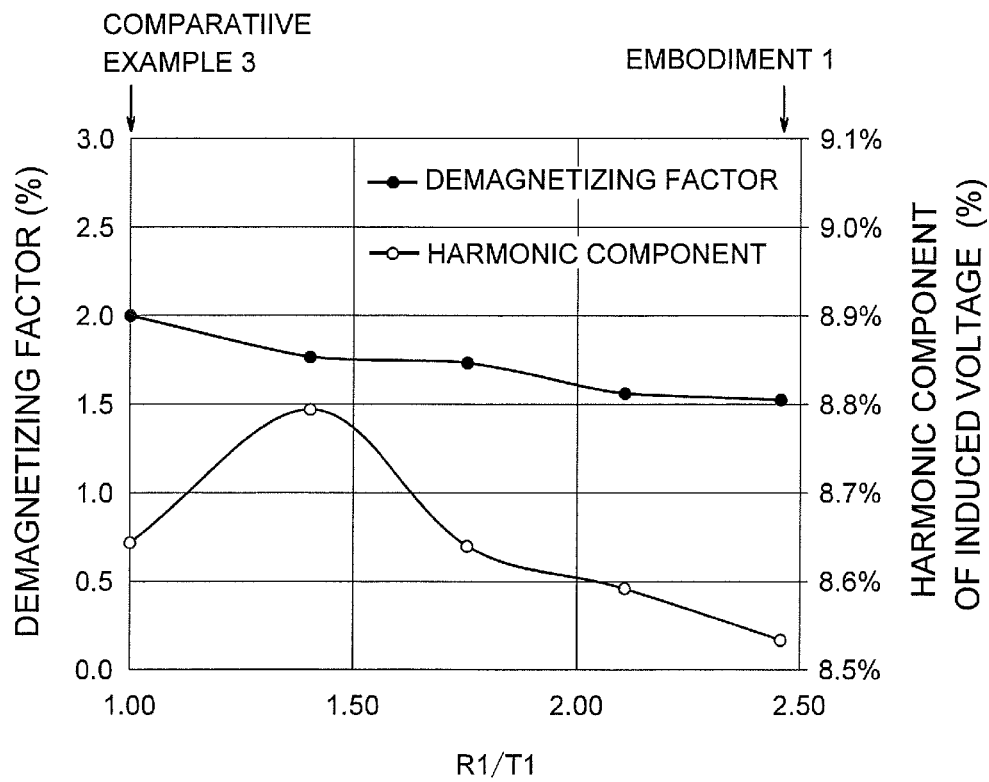
FIG. 9 is a graph illustrating a relationship between R1/T1 and the demagnetizing factor and the harmonic component of the induced voltage.

FIG. 9 illustrates the measurement results of the demagnetizing factor and the harmonic component of the induced voltage when R1/T1 in the rotor core 10 according to Embodiment 1 is changed. R1/T1 on the horizontal axis is a value obtained by dividing the distance R1 from the reference point P to the slit 32 (second slit) by the shortest distance T1 from the magnet insertion hole 12 to the slit 34 (first slit). The vertical axis indicates the measurement results of the demagnetizing factor (left) and the harmonic component of the induced voltage (right). In FIG. 9, T1 is set equal to that in Comparative Example 3 (FIG. 7(C)), and R1/T1 is changed in a range of 1.0 to 2.45.

As illustrated in FIG. 9, as R1/T1 increases, the harmonic component of the induced voltage decreases, and the demagnetizing factor of the permanent magnets 2 also decreases. In other words, it is understood that both of the demagnetizing factor and the harmonic component of the induced voltage can be suppressed by making the distance (R1) from the reference point P to the slit 32 large relative to the shortest distance (T1) from the magnet insertion hole 12 to the slit 34.

Figure 10:
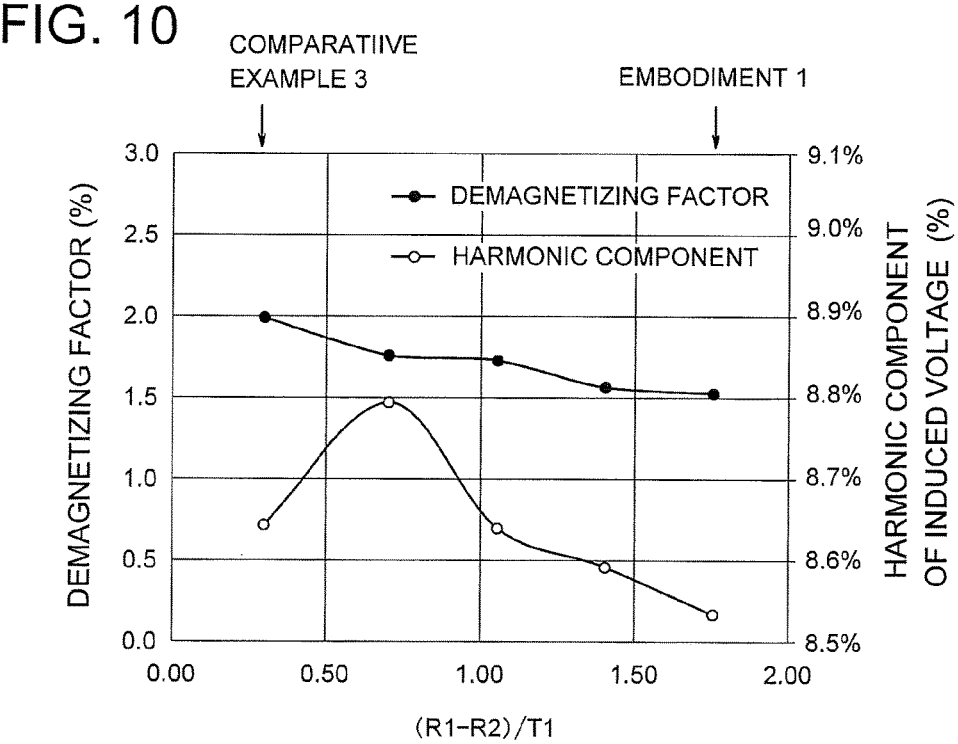
FIG. 10 is a graph illustrating a relationship between (R1−R2)/T1 and the demagnetizing factor and the harmonic component of the induced voltage.

FIG. 10 illustrates the measurement results of the demagnetizing factor and the harmonic component of the induced voltage when (R1−R2)/T1 in the rotor core 10 according to Embodiment 1 is changed. (R1−R2)/T1 on the horizontal axis is a value obtained by dividing the difference (R1−R2) between the distance R1 from the reference point P to the slit 32 and the distance R2 from the reference point P to the inner circumference of the opening 15 by the shortest distance T1 from the magnet insertion hole 12 to the slit 34. The vertical axis indicates the measurement results of the demagnetizing factor (left) and the harmonic component of the induced voltage (right). In FIG. 10, (R1−R2)/T1 is changed in a range of 0.3 to 1.75.

As illustrated in FIG. 10, as (R1−R2)/T1 increases, the harmonic component of the induced voltage decreases, and the demagnetizing factor of the permanent magnet 2 also decreases. In other words, it is understood that both of the demagnetizing factor and the harmonic component of the induced voltage can be suppressed by making the difference (R1−R2) between the distance R1 from the reference point P to the slit 32 and the distance R2 from the reference point P to the inner circumference of the opening 15 large relative to the distance T1 from the magnet insertion hole 12 to the slit 34.

In the rotor core 10 according to Embodiment 1, as an example, R1/T1 is set to 2.45, and (R1−R2)/T1 is set to 1.75 (see FIGS. 9 and 10).

(Functions)

Next, functions of the rotor 1 according to Embodiment 1 will be described. A voltage (induced voltage) is induced in the coils 55 of the stator 5 by the magnetic field of the permanent magnets 2 when the rotor 1 rotates. When a three-phase sine wave AC voltage is applied to the coils 55 to drive the motor 100, only a fundamental wave component of the induced voltage contributes to generating a torque, and the harmonic component of the induced voltage turn into torque ripple (torque pulsation). The torque ripple causes vibration and noise of the motor 100.

In the rotor 1 according to the Embodiment 1, the slits 31, 32, 33, and 34 are formed on the outer side of the magnet insertion hole 12 in the radial direction, and thus distribution of magnetic flux flowing from the permanent magnets 2 toward the stator 5 is smoothened, so that the harmonic component of the induced voltage is reduced.

Magnetic flux generated by a demagnetizing field from the stator 5 flows through the region on the outer circumference side in the rotor core 10, that is, an outer side of the magnet insertion hole 12 in the radial direction. The magnetic flux flows through a part where magnetic resistance is low (a part formed by electromagnetic steel sheets), and accordingly flows from the region on the outer circumference side in the rotor core 10 into the bridges 11a and 11b. As a result, demagnetization (irreversible demagnetization) gradually progresses from corners of the permanent magnets 2a, 2b and 2c close to the bases of the bridges 11a and 11b and corners of the permanent magnets 2a and 2c close to the flux barriers 16. If demagnetization occurs, the magnetic forces of the permanent magnets 2a, 2b, and 2c decrease, and efficiency and output of the motor 100 are reduced.

In particular, when the slits 31, 32, 33, and 34 are provided to reduce the harmonic component of the induced voltage, the magnetic flux generated by the demagnetizing field is more likely to concentrate on the region between the magnet insertion hole 12 and the slits 31, 32, 33, and 34, and thus the magnetic flux is more likely to flow into the bridges 11a and 11b. Therefore, as is apparent from comparison between the demagnetizing factors in Comparative Example 2 and Comparative Example 3 illustrated in FIG. 8, the permanent magnets 2a, 2b, and 2c are more likely to be demagnetized, as the intervals between the magnet insertion hole 12 and the slits 31, 32, 33, and 34 decrease.

Thus, in this Embodiment 1, the distance R1 from the reference point P to the slit 32 (second slit) closest to the bridge 11 is set longer than the shortest distance T1 from the magnet insertion hole 12 to the end slit 34 (first slit).

That is, the distance R1 from the reference point P to the slit 32 closest to the bridge 11 is increased, so that a region wider than a region between the magnet insertion hole 12 and the slit 34 is formed on the outer circumference side of the bridge 11 in the rotor core 10. Thus, the magnetic flux generated by the demagnetizing field is inhibited from concentrating, and is inhibited from flowing into the bridges 11. This makes it possible to achieve both of reduction in harmonic component of the induced voltage and suppression of the demagnetization of the permanent magnets 2.

When R2 represents the distance from the reference point P to a point farthest from the reference point P on the inner circumference of the opening 15, (R1−R2)>T1 is satisfied. Thus, a region wider than a region between the magnet insertion hole 12 and the slit 34 is formed on the outer circumference side of the bridge 11 and outside the opening 15 in the rotor core 10. Therefore, effect of inhibiting the magnetic flux generated by the demagnetizing field from flowing into the bridges 11 can be enhanced, and effect of suppressing the demagnetization of the permanent magnets 2 can be enhanced.

In the Embodiment 1, since the slit 31 is located on the magnetic pole center line A1, and the slits 32 and 33 are inclined toward the magnetic pole center line A1, magnetic flux emanated from the permanent magnets 2 can be focused on the magnetic pole center line A1. Therefore, torque of the motor 100 can be enhanced.

Effects of Embodiment

As described above, the rotor core 10 according to Embodiment 1 includes a plurality of slits 31, 32, 33, and 34 on the outer side of the magnet insertion hole 12 in the radial direction, and the bridges 11 in the magnet insertion hole 12. The shortest distance T1 from the magnet insertion hole 12 to the end slit 34 (first slit), and the shortest distance R1 from the reference point P to the slit 32 (second slit) closest to the bridge 11 satisfy R1>T1.

With this arrangement, the strength of the rotor core 10 can be increased by the bridges 11, and the harmonic component of the induced voltage can be reduced by the slits 31, 32, 33, and 34. Since the distance R1 from the reference point P to the slit 32 (second slit) closest to the bridge 11 is longer than the distance T1 from the magnet insertion hole 12 to the end slit 34 (first slit), the magnetic flux generated by the demagnetizing field can be inhibited from flowing into the bridges 11, and the demagnetization of the permanent magnets 2 can be suppressed. In other words, vibration and noise of the motor 100 can be suppressed, and reliability of the motor 100 can be enhanced.

In particular, since the shortest distance T2 from the magnet insertion hole 12 to the slit 32 is longer than the shortest distance T1 from the magnet insertion hole 12 to the slit 34, concentration of the magnetic flux can be effectively suppressed in the region on the outer circumference side of the bridge 11 in the rotor core 10. Thus, the effect of suppressing the demagnetization of the permanent magnets 2 can be enhanced.

Since the inner end edge 34a of the slit 34 (first slit) facing the magnet insertion hole 12 is parallel to the outer end edge 14 of the magnet insertion hole 12, the effect of reducing the harmonic component of the induced voltage can be enhanced.

Since the length L2 of the slit 32 (second slit) in the radial direction is shorter than the length L1 of the slit 34 (first slit) in the radial direction, the effect of reducing the harmonic component of the induced voltage and the effect of suppressing the demagnetization of the permanent magnets 2 can be enhanced.

Since the shortest distance from the magnet insertion hole 12 to the slit 31 (third slit) is equal to T1, effect of smoothening flow of the magnetic flux from the permanent magnets 2 can be enhanced, and the effect of reducing the harmonic component of the induced voltage can be further enhanced.

When R2 represents the distance from the reference point P to the point farthest from the reference point P on the inner circumference of the opening 15, R1−R2>T1 is satisfied. Thus, a wide region can be provided on the outer circumference side of the bridge 11 and outside the opening 15 in the rotor core 10. Thus, the effect of inhibiting the magnetic flux generated by the demagnetizing field from flowing into the bridges 11 can be enhanced, and the effect of suppressing the demagnetization of the permanent magnets 2 can be further enhanced.

Since the rotor core 10 includes the openings 15 on the outer end edge 14 and the inner end edge 13 of the magnet insertion hole 12 so as to be adjacent to the bridges 11, the permanent magnets 2 can be efficiently disposed in the magnet insertion holes 12.

The slits 31, 32, 33, and 34 are not limited to having the shapes illustrated in FIGS. 3 to 6, and may have various shapes. Modifications of Embodiment 1 will be described below.

Modifications.

Figure 11:
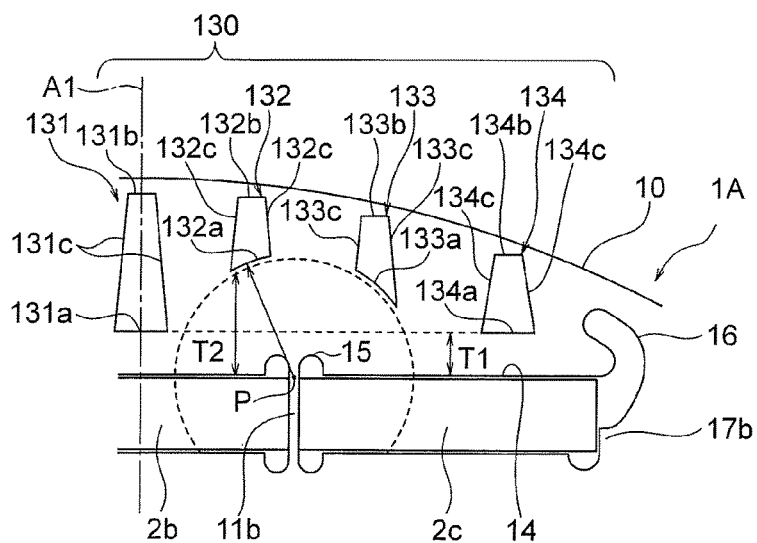
FIG. 11 is an enlarged view illustrating a part of a rotor according to a Modification of Embodiment 1.

FIG. 11 is a view illustrating a part of a rotor 1A according to a Modification of Embodiment 1. In the rotor 1A according to the Modification illustrated in FIG. 11, shapes of slits 131, 132, 133, and 134 constituting a slit group 130 are different from those of the slits 31, 32, 33, and 34 of the rotor 1 according to Embodiment 1.

Locations of the slits 131, 132, 133, and 134 in the circumferential direction are the same as those of the slits 31, 32, 33, and 34 according to Embodiment 1. However, each of the slits 131, 132, 133, and 134 has a trapezoidal shape. More specifically, each of the slits 131, 132, 133, and 134 is shaped so that a length in the circumferential direction decreases outward in the radial direction. The slits 131, 132, 133, and 134 are not inclined with respect to the magnetic pole center line A1.

The slit 131 (third slit) includes an inner end edge 131a on an inner side in the radial direction, an outer end edge 131b on an outer side in the radial direction, and a pair of side end edges 131c on both sides in the circumferential direction. The inner end edge 131a and the outer end edge 131b extend parallel to the outer end edge 14 of the magnet insertion hole 12. The pair of side end edges 131c are inclined symmetrically with respect to the magnetic pole center line A1.

Each slit 132 (second slit) includes an inner end edge 132a on an inner side in the radial direction, an outer end edge 132b on an outer side in the radial direction, and a pair of side end edges 132c on both sides in the circumferential direction. The inner end edge 132a extends in an arc along a circle having the radius R1 about the above described reference point P. The outer end edge 132b extends parallel to the outer end edge 14 of the magnet insertion hole 12. The pair of side end edges 132c are inclined symmetrically with respect to a straight line that passes through a center of the outer end edge 132b and is parallel to the magnetic pole center line A1.

Each slit 133 includes an inner end edge 133a on an inner side in the radial direction, an outer end edge 133b on an outer side in the radial direction, and a pair of side end edges 133c on both sides in the circumferential direction. The inner end edge 133a extends in an arc along a circle having the radius R1 about the above described reference point P. The outer end edge 133b extends parallel to the outer end edge 14 of the magnet insertion hole 12. The pair of side end edges 133c are inclined symmetrically with respect to a straight line that passes through a center of the outer end edge 133b and is parallel to the magnetic pole center line A1.

Each slit 134 (first slit) includes an inner end edge 134a on an inner side in the radial direction, an outer end edge 134b on an outer side in the radial direction, and a pair of side end edges 134c on both sides in the circumferential direction. The inner end edge 134a and the outer end edge 134b extend parallel to the outer end edge 14 of the magnet insertion hole 12. The pair of side end edges 134c are inclined symmetrically with respect to a straight line that passes through a center of the outer end edge 134b and is parallel to the magnetic pole center line A1.

As in Embodiment 1, the distance from the outer end edge 14 of the magnet insertion hole 12 to the inner end edge 134a of the slit 134 (first slit) is represented by T1. The distance from the outer end edge 14 of the magnet insertion hole 12 to the inner end edge 131a of the slit 131 (third slit) is also T1. The distance from the outer end edge 14 of the magnet insertion hole 12 to the inner end edge 132a of the slit 132 (second slit) is T2 that is longer than T1.

In the Modification illustrated in FIG. 11 as well, the shortest distance T1 from the magnet insertion hole 12 to the end slit 134 (first slit), and the shortest distance R1 from the reference point P to the slit 132 (second slit) closest to the bridge 11 satisfy R1>T1. Thus, the harmonic component of the induced voltage can be reduced, and the demagnetization of the permanent magnets 2 can be reduced.

Figure 12:
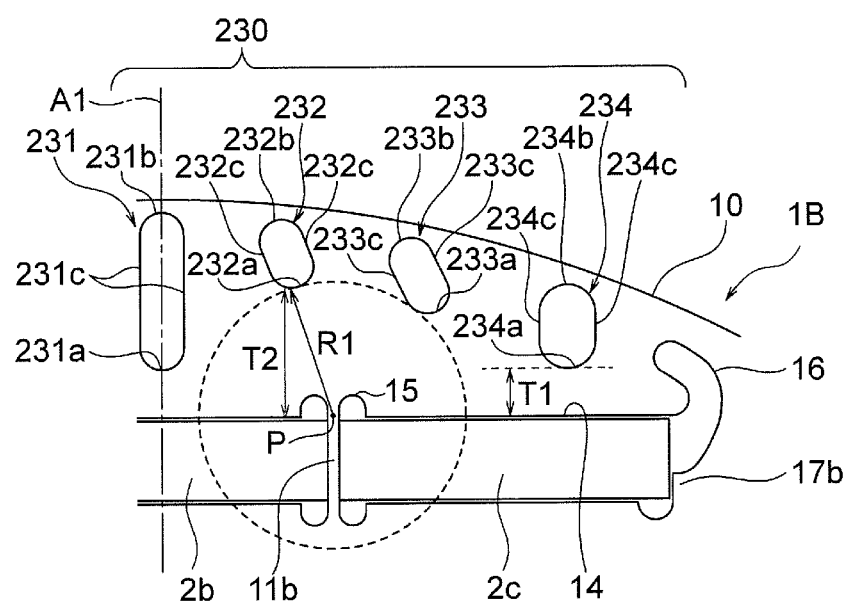
FIG. 12 is an enlarged view illustrating a part of a rotor according to another Modification of Embodiment 1.

FIG. 12 is a view illustrating a part of a rotor 1B according to another Modification of Embodiment 1. In the rotor 1B according to the Modification illustrated in FIG. 12, shapes of slits 231, 232, 233, and 234 constituting a slit group 230 are different from those of the slits 31, 32, 33, and 34 of the rotor 1 according to Embodiment 1.

Locations of the slits 231, 232, 233, and 234 in the circumferential direction are the same as those of the slits 31, 32, 33, and 34 according to Embodiment 1. However, each of the slits 231, 232, 233, and 234 is shaped so that an inner end and an outer end in the radial direction are curved in an arc.

The slit 231 (third slit) includes an inner end edge 231a on an inner side in the radial direction, an outer end edge 231b on an outer side in the radial direction, and a pair of side end edges 231c on both sides in the circumferential direction. Each of the inner end edge 231a and the outer end edge 231b has a shape that is curved in an arc about a point in the slit 231. The side end edges 231c extend parallel to the magnetic pole center line A1.

Each slit 232 (second slit) includes an inner end edge 232a on an inner side in the radial direction, an outer end edge 232b on an outer side in the radial direction, and a pair of side end edges 232c on both sides in the circumferential direction. Each of the inner end edge 232a and the outer end edge 232b has a shape that is curved in an arc about a point in the slit 232. Each side end edge 232c is inclined so that a distance from the magnetic pole center line A1 decreases outward in the radial direction.

Each slit 233 (fourth slit) includes an inner end edge 233a on an inner side in the radial direction, an outer end edge 233b on an outer side in the radial direction, and a pair of side end edges 233c on both sides in the circumferential direction. Each of the inner end edge 233a and the outer end edge 233b has a shape that is curved in an arc about a point in the slit 233. Each side end edge 233c is inclined so that a distance from the magnetic pole center line A1 decreases outward in the radial direction.

Each slit 234 (first slit) includes an inner end edge 234a on an inner side in the radial direction, an outer end edge 234b on an outer side in the radial direction, and a pair of side end edges 234c on both sides in the circumferential direction. Each of the inner end edge 234a and the outer end edge 234b has a shape that is curved in an arc about a point in the slit 234. The side end edges 234c extend parallel to the magnetic pole center line A1.

As in Embodiment 1, the distance from the outer end edge 14 of the magnet insertion hole 12 to the inner end edge 234a of the slit 234 (first slit) is represented by T1. The distance from the outer end edge 14 of the magnet insertion hole 12 to the inner end edge 231a of the slit 231 (third slit) is also T1. The distance from the outer end edge 14 of the magnet insertion hole 12 to the inner end edge 232a of the slit 232 (second slit) is T2 that is longer than T1.

In the Modification illustrated in FIG. 12 as well, the shortest distance T1 from the magnet insertion hole 12 to the end slit 234 (first slit), and the shortest distance R1 from the reference point P to the slit 232 (second slit) closest to the bridge 11 satisfy R1>T1. Thus, the harmonic component of the induced voltage can be reduced, and the demagnetization of the permanent magnets 2 can be suppressed.

Furthermore, in the Modification illustrated in FIG. 12, since each of the slits 231, 232, 233, and 234 is shaped so that both ends in the radial direction are curved, the slits 231, 232, 233, and 234 can be easily formed by machining the electromagnetic steel sheets.

Embodiment 2

Figure 13:
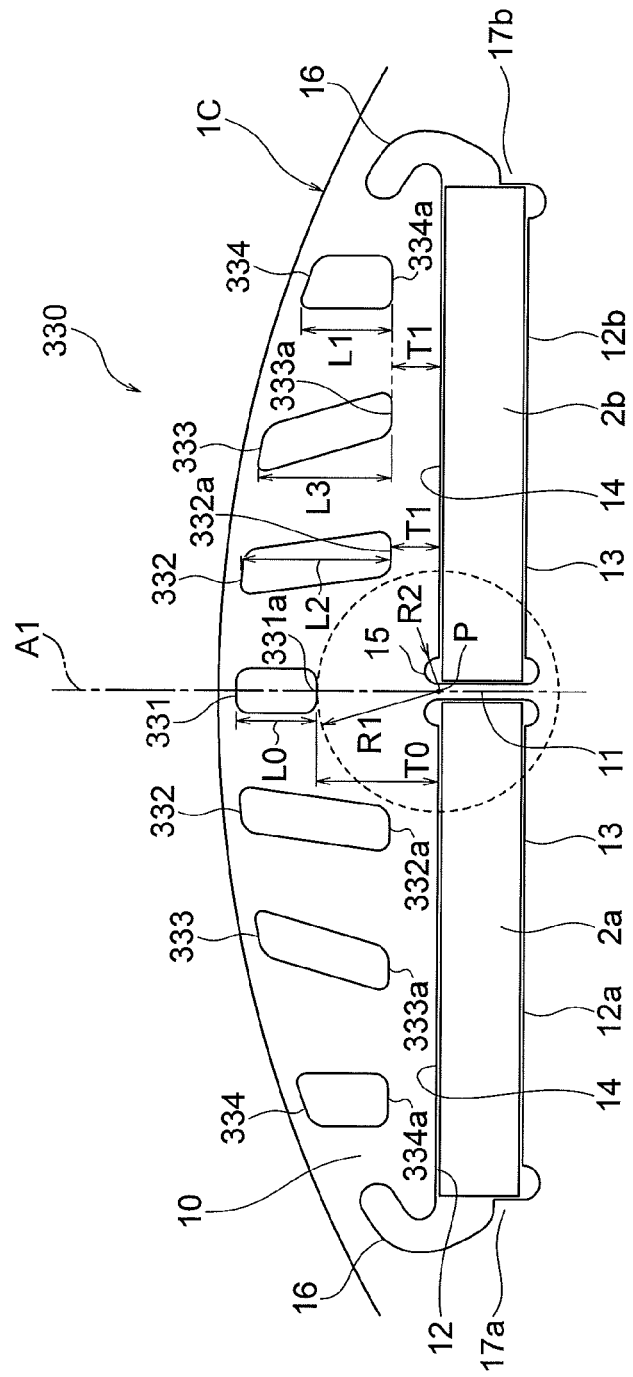
FIG. 13 is an enlarged view illustrating a part of a rotor according to Embodiment 2.

FIG. 13 is a view illustrating a part of a rotor 1C according to Embodiment 2. The rotor 1C according to Embodiment 2 is different from the rotor 1 according to Embodiment 1 in that each magnet insertion hole 12 is divided into two regions 12a and 12b by a single bridge 11. In addition, in the rotor 1C according to Embodiment 2, a configuration of a slit group 330 is different from that of the slit group 30 (FIG. 5) according to Embodiment 1.

The rotor core 10 of the rotor 1C includes a bridge 11 at the center of the magnet insertion hole 12 in the circumferential direction. In other words, the bridge 11 is formed on the magnetic pole center line A1. The bridge 11 connects the inner side and the outer side of the magnet insertion hole 12 in the radial direction and divides the magnet insertion hole 12 into a first region 12a and a second region 12b.

The slit group 330 includes a slit 331 formed at the pole center, a pair of slits 332 formed on both sides of the slit 331 in the circumferential direction, a pair of slits 333 formed on both sides of the slits 332 in the circumferential direction, and a pair of slits 334 formed on both sides of the slits 333 in the circumferential direction.

Of the slit group 330, the slits 334 are slits (first slits) closest to the ends of the magnet insertion hole 12 in the circumferential direction. In the rotor 1C according to Embodiment 2, the bridge 11 is formed at the center of the magnet insertion hole 12 in the circumferential direction, and thus the slit 331 is a slit (second slit) closest to the bridge 11.

The shapes and locations in the circumferential direction of the slits 331, 332, 333, and 334 are the same as those of the slits 31, 32, 33, and 34 according to Embodiment 1. However, the lengths of the slits 331, 332, 333, and 334 in the radial direction and their distances from the magnet insertion hole 12 are different from those in Embodiment 1.

The distance from the outer end edge 14 of the magnet insertion hole 12 to an inner end edge 334a of the slit 334 (first slit), that is, the shortest distance from the magnet insertion hole 12 to the slit 334 is represented by T1, as in Embodiment 1.

The distance from the outer end edge 14 of the magnet insertion hole 12 to an inner end edge 332a of the slit 332 (third slit), that is, the shortest distance from the magnet insertion hole 12 to the slit 332 is also T1. The distance from the outer end edge 14 of the magnet insertion hole 12 to an inner end edge 333a of the slit 333 (third slit), that is, the shortest distance from the magnet insertion hole 12 to the slit 333 is also T1.

The distance from the outer end edge 14 of the magnet insertion hole 12 to an inner end edge 331c of the slit 331 (second slit), that is, the shortest distance from the magnet insertion hole 12 to the slit 331 is T0 that is longer than T1.

When R1 represents the shortest distance from the reference point P described in Embodiment 1 to the slit 331 (second slit), R1>T1 is satisfied. Therefore, a region wider than a region between the magnet insertion hole 12 and the slit 334 is formed on the outer circumference side of the bridge 11 in the rotor core 10.

The slits 331, 332, 333, and 334 have lengths L0, L2, L3, and L1, respectively, in a direction parallel to the magnetic pole center line A1. The length L0 of the slit 331 is the shortest, and the length L1 of the slit 334 is longer than the length L0 of the slit 331. In this example, these lengths satisfy L2>L3>L1>L0.

When R2 represents the distance from the reference point P to a point farthest from the reference point P on the inner circumference of the opening 15, R1−R2>T1 is satisfied, as described in Embodiment 1.

In the Embodiment 2 as well, the shortest distance T1 from the magnet insertion hole 12 to the end slit 334 (first slit), and the shortest distance R1 from the reference point P to the slit 331 (second slit) closest to the bridge 11 satisfy R1>T1. Thus, the harmonic component of the induced voltage can be reduced, and the demagnetization of the permanent magnets 2 can be suppressed. In other words, vibration and noise of the motor 100 can be suppressed, and the reliability of the motor 100 can be enhanced.

Since the shortest distance T0 from the magnet insertion hole 12 to the slit 331 (second slit) is longer than the shortest distance T1 from the magnet insertion hole 12 to the slit 334 (first slit), the effect of inhibiting the magnetic flux generated by the demagnetizing field from flowing into the bridge can be enhanced. Thus, the effect of suppressing the demagnetization of the permanent magnets 2 can be enhanced.

Since the shortest distances from the magnet insertion hole 12 to the slits 332 and 333 (third slits) are equal to T1, the effect of smoothening flow of magnetic flux from the permanent magnets 2 can be enhanced, and the effect of reducing the harmonic component of the induced voltage can be further enhanced.

The bridge 11 is not limited to being formed at the center of the magnet insertion hole 12 in the circumferential direction. The bridge 11 may be formed at any position in the magnet insertion hole 12.

The slits 331, 332, 333, and 334 are not limited to having the shapes illustrated in FIG. 13, and may have various shapes. A Modification of Embodiment 2 will be described below.

Modification.

Figure 14:
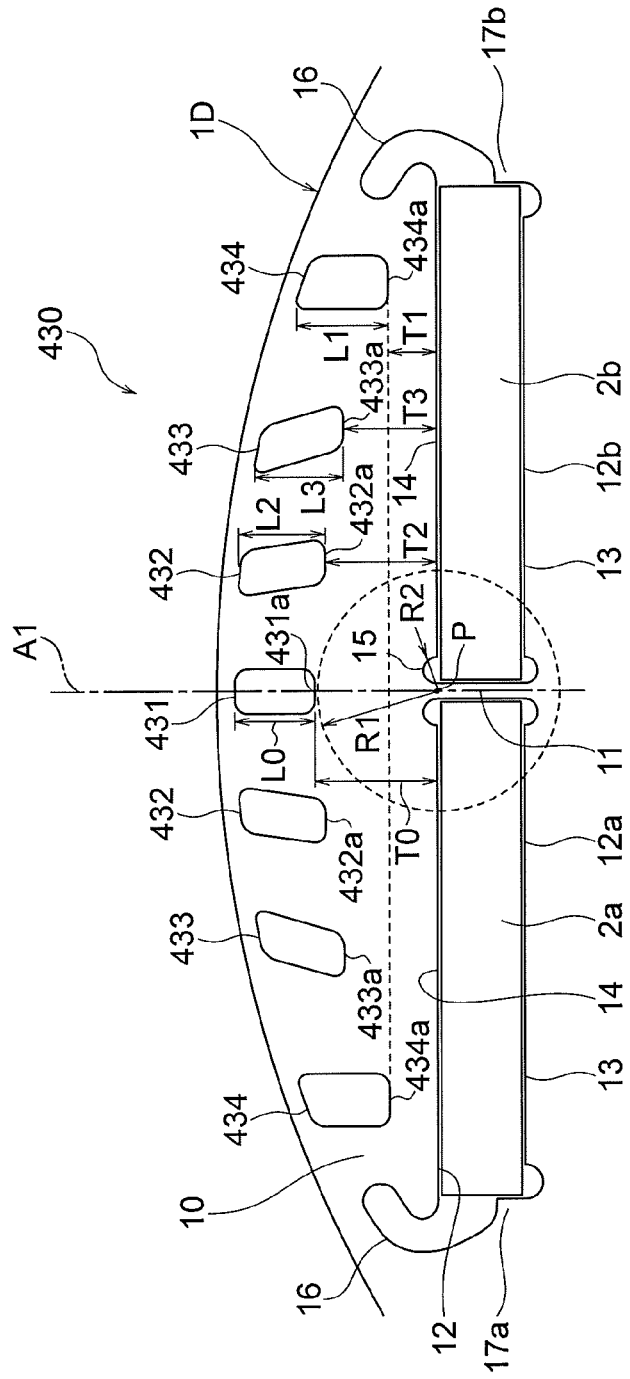
FIG. 14 is an enlarged view illustrating a part of a rotor according to a Modification of Embodiment 2.

FIG. 14 is a view illustrating a part of a rotor 1D according to a Modification of Embodiment 2. In the rotor 1D according to the Modification illustrated in FIG. 14, shapes of slits 431, 432, 433, and 434 constituting a slit group 430 are different from those of the slits 331, 332, 333, and 334 according to Embodiment 2.

Locations of the slits 431, 432, 433, and 434 in the circumferential direction are the same as those of the slits 331, 332, 333, and 334 according to Embodiment 2. Of the slit group 430, the slits 434 are slits (first slits) closest to the ends of the magnet insertion hole 12 in the circumferential direction, and the slit 431 is a slit (second slit) closest to the bridge 11.

The distance from the outer end edge 14 of the magnet insertion hole 12 to an inner end edge 434a of the slit 434 (first slit), that is, the shortest distance from the magnet insertion hole 12 to the slit 434 is represented by T1. The distance from the outer end edge 14 of the magnet insertion hole 12 to an inner end edge 433a of the slit 433, that is, the shortest distance from the magnet insertion hole 12 to the slit 433 is T3 that is longer than T1.

The distance from the outer end edge 14 of the magnet insertion hole 12 to an inner end edge 432a of the slit 432, that is, the shortest distance from the magnet insertion hole 12 to the slit 432 is T2 that is longer than T3. The distance from the outer end edge 14 of the magnet insertion hole 12 to an inner end edge 431a of the slit 431 (second slit), that is, the shortest distance from the magnet insertion hole 12 to the slit 431 is T0 that is longer than T2. In other words, a relationship of T0>T2>T3>T1 is satisfied.

The slits 431, 432, 433, and 434 have lengths L0, L2, L3, and L1, respectively, in a direction parallel to the magnetic pole center line A1. The length L3 of the slit 433 is the longest, and the length L0 of the slit 431 (second slit) is the shortest. The length L1 of the slit 434 (first slit) is longer than the length L0 of the slit 431. In this example, these lengths satisfy L3>L2>L1>L0.

When R2 represents the distance from the reference point P to a point farthest from the reference point P on the inner circumference of the opening 15, R1−R2>T1 is satisfied, as described in Embodiment 1.

In the Modification illustrated in FIG. 14 as well, the shortest distance T1 from the magnet insertion hole 12 to the end slit 434 (first slit), and the shortest distance R1 from the reference point P to the slit 431 (second slit) closest to the bridge 11 satisfy R1>T1. Thus, the harmonic component of the induced voltage can be reduced, and the demagnetization of the permanent magnets 2 can be suppressed, as in Embodiment 2.

Since the shortest distance T0 from the magnet insertion hole 12 to the slit 431 (second slit) is longer than the shortest distance T1 from the magnet insertion hole 12 to the slit 434 (first slit), the effect of inhibiting the magnetic flux generated by the demagnetizing field from flowing into the bridge can be enhanced. Thus, the effect of suppressing the demagnetization of the permanent magnets 2 can be enhanced.

Since the length L0 of the slit 431 (second slit) in the radial direction is shorter than the length L1 of the slit 434 (first slit) in the radial direction, the effect of reducing the harmonic component of the induced voltage can be enhanced, and the effect of suppressing the demagnetization of the permanent magnets 2 can be enhanced.

The shapes and locations of the slits in the Modifications (FIGS. 11 and 12) of Embodiment 1 may be applied to Embodiment 2 (FIG. 13) or the Modification (FIG. 14) of Embodiment 2.

In each of the above described Embodiments and Modifications, each magnet insertion hole 12 of the rotor core 10 is divided into two or three regions by the bridge or bridges 11, but the magnet insertion hole 12 may be divided into four or more regions.

(Compressor)

Figure 15:
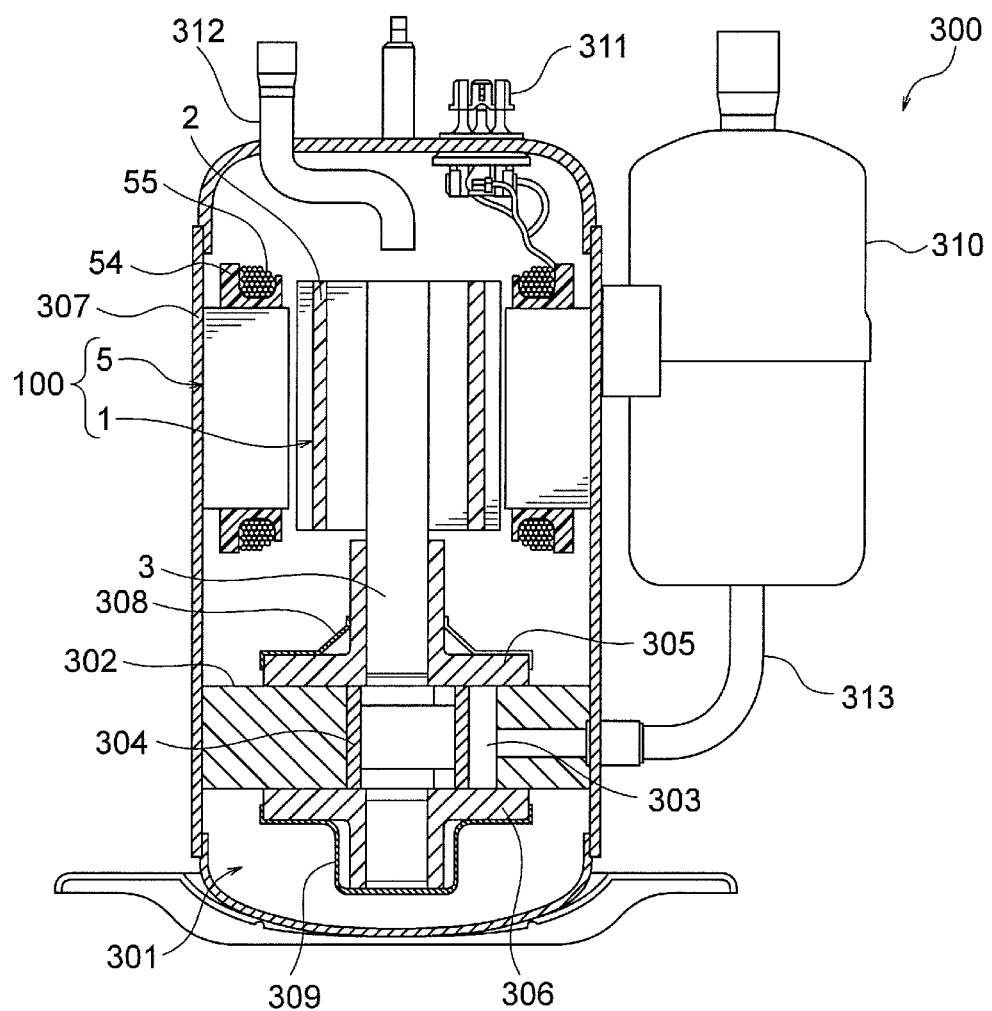
FIG. 15 is a longitudinal sectional view of a compressor to which the motor according to each of the Embodiments is applicable.

Next, a compressor 300 to which the motor 100 described in any of the Embodiments 1, 2 and the Modifications is applicable will be described. FIG. 15 is a sectional view illustrating a configuration of the compressor 300. The compressor 300 is a rotary compressor in this example and used in, for example, an air conditioner. The compressor 300 includes a closed container 307, a compression mechanism 301 disposed in the closed container 307, and a motor 100 for driving the compression mechanism 301.

The compression mechanism 301 includes a cylinder 302 including a cylinder chamber 303, a shaft 3 rotated by the motor 100, a rolling piston 304 fixed to the shaft 3, a vane (not illustrated) separating the cylinder chamber 303 into a suction side and a compression side, and an upper frame 305 and a lower frame 306 through which the shaft 3 is inserted. The upper frame 305 and the lower frame 306 close end faces of the cylinder chamber 303 in the axial direction. An upper discharge muffler 308 and a lower discharge muffler 309 are mounted on the upper frame 305 and the lower frame 306, respectively.

The closed container 307 is a cylindrical container. Refrigeration machine oil (not illustrated) for lubricating sliding portions of the compression mechanism 301 is stored at a bottom of the closed container 307. The shaft 3 is rotatably held by the upper frame 305 and the lower frame 306 serving as bearing parts.

The cylinder 302 has the cylinder chamber 303 therein, and the rolling piston 304 eccentrically rotates in the cylinder chamber 303. The shaft 3 includes an eccentric shaft part, and the rolling piston 304 is fitted to the eccentric shaft part.

The stator 5 of the motor 100 is mounted inside a frame of the closed container 307 by a method such as shrink fitting. Power is supplied to the coils 55 of the stator 5 from a glass terminal 311 fixed to the closed container 307. The shaft 3 is fixed to the shaft hole 18 formed at the center of the rotor core 10 (FIG. 3) of the rotor 1.

An accumulator 310 for storing refrigerant gas is mounted outside the closed container 307. A suction pipe 313 is fixed to the closed container 307, and the refrigerant gas is supplied from the accumulator 310 to the cylinder 302 via the suction pipe 313. A discharge pipe 312 for discharging the refrigerant to the outside is provided in the upper part of the closed container 307.

The refrigerant gas supplied from the accumulator 310 is supplied into the cylinder chamber 303 of the cylinder 302 through the suction pipe 313. When the motor 100 is driven to rotate the rotor 1, the shaft 3 rotates together with the rotor 1. The rolling piston 304 fitted to the shaft 3 eccentrically rotates in the cylinder chamber 303 to compress the refrigerant in the cylinder chamber 303. The refrigerant compressed in the cylinder chamber 303 passes through the discharge mufflers 308 and 309, further passes through air holes (not illustrated), flows upward in the closed container 307, and is discharged through the discharge pipe 312.

With the motor 100 described in each of the Embodiments and Modifications, demagnetization of the permanent magnets is less likely to occur, and a stable output can be obtained. Thus, operation efficiency of the compressor 300 can be enhanced.

(Air Conditioner)

Figure 16:
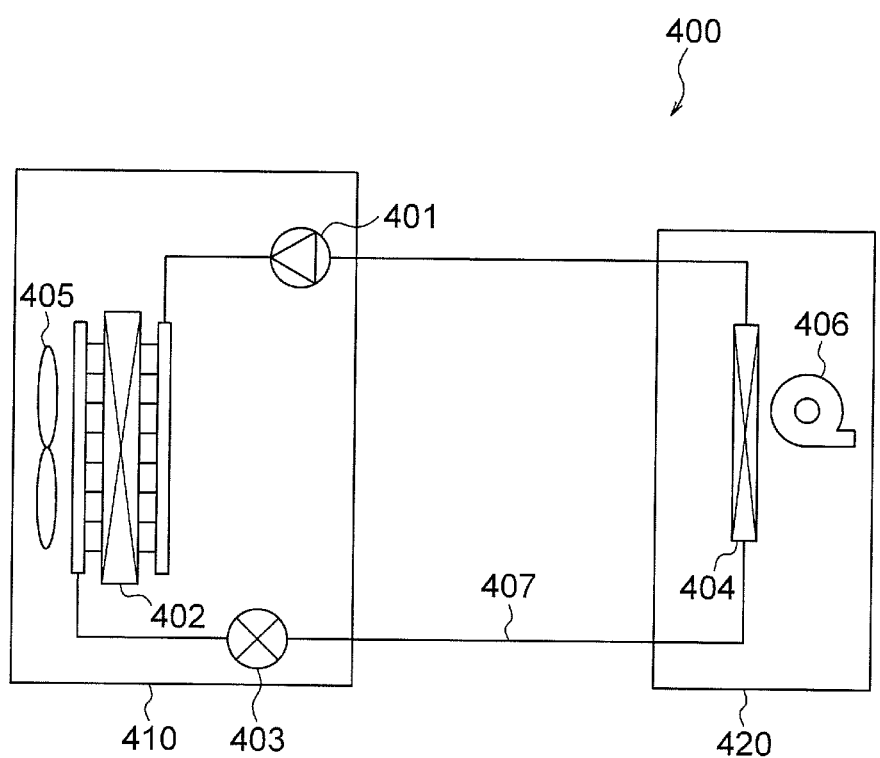
FIG. 16 is a diagram illustrating an air conditioner (refrigeration cycle apparatus) including the compressor in FIG. 15.

Next, an air conditioner (refrigeration cycle apparatus) including the compressor 300 illustrated in FIG. 15 will be described. FIG. 16 is a diagram illustrating a configuration of an air conditioner 400. The air conditioner 400 illustrated in FIG. 16 includes a compressor 401, a condenser 402, a throttle device (expansion valve) 403, and an evaporator 404. The compressor 401, the condenser 402, the throttle device 403, and the evaporator 404 are connected via a refrigerant pipe 407 to form a refrigeration cycle. In other words, a refrigerant circulates through the compressor 401, the condenser 402, the throttle device 403, and the evaporator 404 in this order.

The compressor 401, the condenser 402, and the throttle device 403 are disposed in an outdoor unit 410. The compressor 401 is constituted by the compressor 300 illustrated in FIG. 15. An outdoor fan 405 for supplying outdoor air to the condenser 402 is disposed in the outdoor unit 410. The evaporator 404 is disposed in an indoor unit 420. An indoor fan 406 for supplying indoor air to the evaporator 404 is disposed in the indoor unit 420.

An operation of the air conditioner 400 is as follows. The compressor 401 compresses sucked refrigerant and sends out the compressed refrigerant. The condenser 402 exchanges heat between the refrigerant flowing from the compressor 401 and the outdoor air, condenses and liquefies the refrigerant, and sends out the liquefied refrigerant to the refrigerant pipe 407. The outdoor fan 405 supplies outdoor air to the condenser 402. The throttle device 403 changes its opening degree to thereby adjust a pressure or the like of the refrigerant flowing through the refrigerant pipe 407.

The evaporator 404 exchanges heat between the refrigerant brought into a low pressure state by the throttle device 403 and the indoor air, causes the refrigerant to take heat from the air and evaporate (vaporize), and sends out the refrigerant to the refrigerant pipe 407. The indoor fan 406 supplies the indoor air to the evaporator 404. Thus, cooled wind deprived of heat by the evaporator 404 is supplied into the room.

The motors 100 described in each of the Embodiments and Modifications is applicable to the compressor 401 (the compressor 300 illustrated in FIG. 15), and thus high operation efficiency can be obtained. Hence, operation efficiency of the air conditioner 400 can be enhanced.

While desirable embodiments of the present invention have been described in detail above, the present invention is not limited thereto, and various improvements or modifications may be made without departing from the gist of the present invention.

The motor 100 described in each of the Embodiments and Modifications is not limited to the compressor 300 described with reference to FIG. 15, and may be applied to other types of compressors. The air conditioner using the motor 100 is not limited to the air conditioner 400 described with reference to FIG. 16.

What is claimed is:

1. A rotor comprising:
   a rotor core having an outer circumference extending in a circumferential direction about an axis, and having a magnet insertion hole along the outer circumference; and
   a permanent magnet disposed in the magnet insertion hole,
   wherein the rotor core has:
   a plurality of slits formed on an outer side of the magnet insertion hole in a radial direction about the axis; and
   a bridge dividing the magnet insertion hole corresponding to one magnetic pole, the bridge extending to connect an inner side and an outer side of the magnet insertion hole in the radial direction, wherein the plurality of slits have a first slit closest to an end of the magnet insertion hole in the circumferential direction, and a second slit closest to the bridge, wherein when T1 represents a shortest distance from the magnet insertion hole to the first slit, a reference point represents a point located at a center of the bridge in the circumferential direction on a straight line defining an end edge of the magnet insertion hole on an outer side in the radial direction, and R1 represents a shortest distance from the reference point to the second slit, R1>T1 is satisfied.

2. The rotor according to claim 1, wherein the shortest distance from the magnet insertion hole to the first slit is shorter than a shortest distance from the magnet insertion hole to the second slit.

3. The rotor according to claim 1, wherein an end edge of the first slit facing the magnet insertion hole is parallel to the end edge of the magnet insertion hole located on the outer side in the radial direction.

4. The rotor according to claim 1, wherein a length of the second slit in the radial direction is shorter than a length of the first slit in the radial direction.

5. The rotor according to claim 1, wherein the plurality of slits have a third slit in addition to the first slit and the second slit.

6. The rotor according to claim 5, wherein a shortest distance from the magnet insertion hole to the third slit is shorter than a shortest distance from the magnet insertion hole to the second slit.

7. The rotor according to claim 6, wherein the shortest distance from the magnet insertion hole to the third slit is equal to T1.

8. The rotor according to claim 1, wherein the rotor core has an opening on the end edge of the magnet insertion hole on the outer side in the radial direction, the opening being adjacent to the bridge and having a curved inner circumferential surface.

9. The rotor according to claim 8, wherein when R2 represents a distance from the reference point to a point farthest from the reference point on the inner circumferential surface of the opening, R1−R2>T1 is satisfied.

10. The rotor according to claim 1, wherein the second slit is inclined so that a distance from a straight line decreases outward in the radial direction, the straight line extending in the radial direction and passing through a center of the magnet insertion hole in the circumferential direction.

11. The rotor according to claim 1, wherein the second slit has an end edge extending along an arc about the reference point.

12. The rotor according to claim 1, wherein each of the first slit and the second slit has a shape such that a length thereof in the circumferential direction decreases as a distance from the magnet insertion hole increases.

13. The rotor according to claim 1, wherein each of the first slit and the second slit has a shape such that two ends thereof in the radial direction are curved.

14. The rotor according to claim 1, wherein the rotor core has at least two bridges including the bridge, the at least two bridges dividing the magnet insertion hole into at least three regions.

15. A motor comprising:
a stator; and
the rotor according to claim 1, disposed on an inner side of the stator.

16. A compressor comprising a motor, and a compression mechanism driven by the motor,
the motor comprising:
a stator; and
the rotor according to claim 1, disposed on an inner side of the stator.

17. An air conditioner comprising a compressor, a condenser, a decompressor, and an evaporator,
the compressor comprising a motor, and a compression mechanism driven by the motor,
the motor comprising:
a stator; and
the rotor according to claim 1, disposed on an inner side of the stator.

18. The rotor according to claim 1, wherein the magnet insertion hole linearly extends in a direction perpendicular to a line in the radial direction passing through a center of the magnet insertion hole in the circumferential direction.

* * * * *